UNITED STATES PATENT OFFICE.

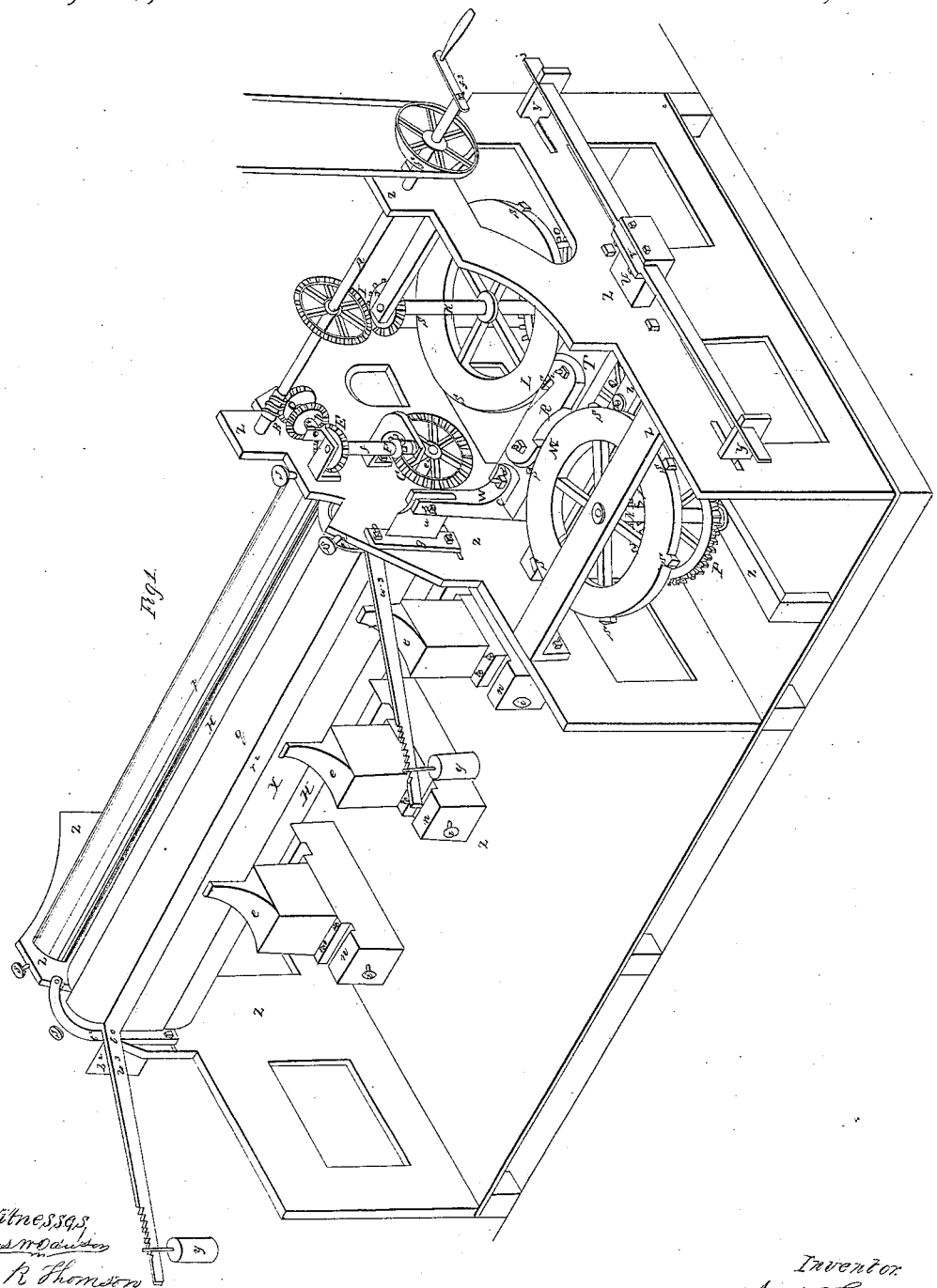

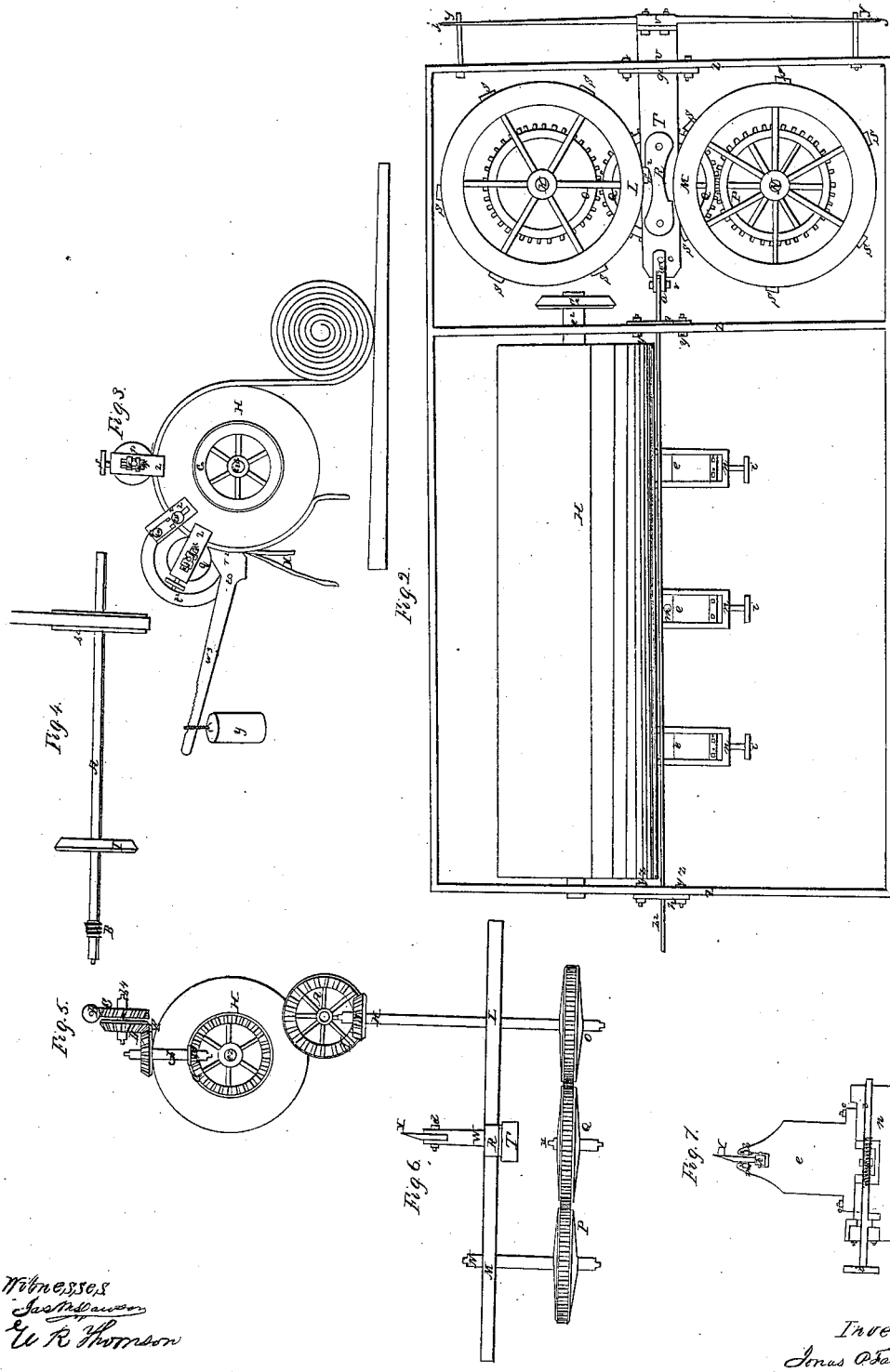

JONAS P. FAIRLAMB, OF WILMINGTON, DELAWARE.

MACHINE FOR SPLITTING LEATHER.

Specification of Letters Patent No. 5,456, dated February 22, 1848.

*To all whom it may concern:*

Be it known that I, JONAS P. FAIRLAMB, of the city of Wilmington, in the county of Newcastle and State of Delaware, have invented a new and Improved Mode of Splitting and Currying or Shaving Leather and of Splitting Untanned and Green Hides and Hides Partially Tanned; and I hereby declare that the following is a full and exact description.

I provide a substantial frame (Z Figure 1 and partially Figs. 2 and 3,) the same letter representing the same part of the machine contained in the several figures, using the great and small letters of the common alphabet, except in a few cases when some of the small letters are used with numbers representing different parts of the machine, the said numbers also differing, and in one case numbers are used only, and in one other case, three letters, *per* and *per* 2d, used and one figure is referred to only, which aforesaid frame I make of strong material sufficient to support firmly, the following described machinery, which machinery I construct as follows, to wit, I construct a propelling shaft (A Figs. 1 and 4) of the necessary strength and dimensions, and support said shaft in a horizontal position, upon its two journals, by the aforesaid frame, in the common way of supporting horizontal shafts in machinery. I construct upon the aforesaid horizontal propelling shaft, a drum or pulley (*f* 2nd Figs. 1 and 4) or handle (*f* 3rd Fig. 1) or some convenient wheel and at a convenient place of said shaft, by some one of which I communicate in the usual way the necessary steam, water, horse or hand power, and motion, to the said propelling shaft, for driving or propelling the whole of said machinery. I connect and communicate, by common spiral and bevel wheels (B, C, D, E, F, G, Figs. 1, 2, 3, 4, and 5) one horizontal shaft (*f* 4th Figs. 1 and 5) and one perpendicular shaft (*f* Figs. 1 and 5) to one of the journals (*e* 2nd Figs. 1, 2, 3 and 5) of a cylinder (H Figs. 1, 2, 3, and 5). I construct the aforesaid cylinder, about eighteen or twenty inches in diameter by preference and of sufficient length to receive the hide or skin to be operated on in one sheet spread out without any folding, and I support the said cylinder in a horizontal position on its journals by the aforesaid frame, in the usual manner of supporting horizontal cylinders in machinery. By preference I construct the aforesaid cylinder of freestone or other material of the same nature, on account of the greater cohesion of hides when wet, and of leather when saturated with water; to such material, and on account of such material not being liable to stain the hide or leather, when in contact therewith. By the said power so communicated as aforesaid to one of the journals of the said cylinder, I cause by preference, the aforesaid cylinder to revolve once on its journals in about four minutes, and to have about one quarter of an inch periphery motion per second. I also connect and communicate by common bevel wheels (I, J, Figs. 1, 4, and 6) the necessary power and motion from the aforesaid propelling shaft A to a perpendicular tappet wheel shaft (K Figs. 1, 2 and 6) hereinafter mentioned, which motion, I make by preference to be about forty revolutions per minute.

I construct one other perpendicular tappet wheel shaft (N Figs. 1, 2, and 6) to which I connect equal power and motion with the said first mentioned tappet wheel shaft, as follows. I construct three spur wheels, (O, P, and Q Figs. 1, 2 and 6) and I make each of said spur wheels of the same dimensions, with the same diameters, and same number of cogs or teeth in each wheel, the first of said spur wheels, O, I secure firmly on the first above mentioned tappet wheel shaft, K, near the lower end thereof in the usual way.

The second of said spur wheels, P, I secure, firmly, to the last above mentioned tappet wheel shaft, N, near the lower end thereof, in the same manner and so as to revolve in the same horizontal plane of the said first mentioned spur wheel, O. I construct one perpendicular and carrying wheel shaft (X, Figs. 1 and 6) and I secure firmly to the said shaft, X, the other of said three spur wheels, Q, in the same manner and so as to revolve in the same horizontal plane of the two before mentioned spur wheels (O and P) and I make a carrying or transferring wheel of the said last mentioned wheel, Q, by placing it between and gearing it into both the other before mentioned wheels. The said carrying wheel may be varied in diameter and number of cogs or teeth, if convenience should require it, the result will be the same, in transferring power and motion. I place the said last above mentioned three perpendicular shafts (K, N, X,) in one straight line, drawn at right angles with the axis, and parallel with the horizontal transverse diameter of the before mentioned cylinder, H, or in other words, in a straight line forming a square with the lengthway position of said cylinder and at a sufficient distance from the face of the aforesaid bevel wheel, G, on the journal (e 2nd Figs. 1, 2, 3, and 5,) of the aforesaid cylinder, H, to admit the free motion of all the said wheels on said perpendicular shafts, without coming in contact with said bevel wheel. And I support the aforesaid three perpendicular shafts, in their proper places in the line aforesaid, so as to suit the arrangement hereinafter specified of the tappet wheels and tappet plate also hereinafter specified, by the aforesaid frame (Z) in the usual manner of supporting perpendicular shafts in machinery.

I construct upon the aforesaid tappet wheel shafts (K, and N,) two tappet wheels (L and M, Figs. 1, 2 and 6,) above the spur wheels, secured on the same shafts as aforesaid. I make the said tappet wheels, equal in dimensions in every way; one of which tappet wheels L, I place firmly on the first above mentioned tappet wheel shaft K; the other tappet wheel M, I place firmly, on the last above mentioned tappet wheel shaft, N, so that both the said tappet wheels shall revolve in the same horizontal plane; and I construct in the same horizontal plane a vibrating tappet plate (R, Figs. 1, 2 and 6,) so as to vibrate freely endwise in a direct line parallel with the axis of the aforesaid cylinder H, and so as to form the connection of the said tappet plate, with a slide plate (T, Figs. 1, 2, and 6,) hereinafter mentioned, and which tappet plate I place between the adjacent peripheries of the said tappet wheels. And the said adjacent peripheries of said tappet wheels not only have equal power and equal velocity, but have equal reverse or contrary motion, because the adjacent periphery of the said two spur wheels fastened on the said tappet wheel shafts, are geared into opposite sides of the aforesaid carrying wheel, Q, as aforesaid.

I construct strong tappets (S, Figs. 1, and 2) on the peripheries of the aforesaid two tappet wheels, L and M, projecting a short distance (about one inch) from said peripheries, all of which tappets being an equal number on each tappet wheel, I place on the periphery of each tappet wheel aforesaid, at the same distance apart. The diameter of said tappet wheels I make by preference about two feet for a large machine with six tappets on each wheel, this diameter and the number of tappets admit of considerable variations, always making the number of tappets the same on each wheel, and the same equal distance apart. I place the said two tappet wheel shafts in the straight line aforesaid, at the distance apart, equal to the radii of the said two tappet wheels, added to the width of the aforesaid tappet plate, or one diameter of said wheels added to said width which is the same. The said shaft of the said carrying wheel I also place, in the same straight line at equal distance from each of the two aforesaid tappet wheel shafts and directly under the center of the aforesaid tappet plate, and the center of the space between the peripheries of the said tappet wheels, leaving sufficient space between the upper journal of said carrying wheel shaft, and the underside of the aforesaid tappet plate for a slide plate (T, Figs. 1, 2, and 6) aforesaid, to vibrate or slide andwise freely each way.

I construct two strong tappets or projections (1, 2, Figs. 1 and 2) I place on each of the two horizontal edges of said tappet plate one of said tappets, so as to project a short space horizontally from said tappet plate, (about three fourths of an inch) and come in contact alternately, with the tappets on the said tappet wheels as the said wheels revolve; and each of the said two tappets I place on said tappet plate, in advance of the respective tappet wheel tappets, nearly the one sixth part of the space, between the tappets on the said tappet wheels, and in advance as aforesaid, from a straight line drawn from center to center of the said tappet wheels; this distance in advance of the said two tappets may be increased at pleasure, by attaching different tappet plates to lessen the vibrations, and ease the escapments of the tappets; always observing to key or otherwise fasten the tappet wheels on their respective shafts, so that when the tappet of one wheel comes in contact with and first starts the tappet and the tappet plate the two adjacent tappets on the other wheel, shall be equidistant from a straight line drawn from center to center of the two tappet wheels, the tappets on the tappet wheels may then come in contact with the tappets on the tappet plate alternately sufficiently deep, or lap thereon a sufficient distance to force the tappet plate each way beyond the first starting place aforesaid in its vibrating line aforesaid nearly the one fourth of the space between the tappets on the tappet wheels, or the one fourth of said space allowing some small distance for escapement of the said tappets. The aforesaid arrangement of tappets I consider the best for tappet wheels two feet in diameter and having six tappets; the said arrangement will admit of variation as aforesaid without changing the principle.

I construct immediately under the aforesaid tappet plate the aforesaid slide plate (T Figs. 1, 2, and 6) to which slide plate I attach the said tappet plate firmly with bolts and nuts. I make the said slide plate, of the requisite strength to move firmly, and in length, long enough to pass one end thereof (U, Figs. 1 and 2) through the end of the aforesaid frame, Z, and I attach to the same end of the said plate a vibrating spring (V, Figs. 1 and 2) hereinafter described and I support the said end of the said slide plate by passing it through a box (g 2nd Fig. 2,) either with or without friction rollers, which box I attach to the end of the said frame with sliding bolts and nuts, and also so that said slide plate may vibrate or slide endwise, backward, and forward through said box freely but firmly in a right line parallel with the axis of the aforesaid cylinder, H; the other end of said slide plate I attach with a center pin and nut (a, Figs. 1 and 2,) to the horizontal part, c, of a double joint piece (W Figs. 1 and 2) hereinafter described.

I construct the aforesaid double joint piece W, so as to clamp the end of the aforesaid slide plate, T, with the horizontal part thereof (c, Figs. 1 and 2,) and with the perpendicular part thereof, I clamp the end (a, Figs. 1 and 2,) of a knife (X, Figs. 1, 2, 3, 6, and 7,) hereinafter described. I secure the said perpendicular clamp to the end aforesaid of the said knife, with a center pin passing it through both clamp and knife, and placing the nut (b, Figs. 1 and 2) on said bolt; and I secure the said horizontal clamp, to the end of the said slide plate, by passing a center pin through both clamp and slide plate, and placing the aforesaid nut, d, on said bolt.

I construct the aforesaid knife (X, Figs. 1, 2, 3, 6 and 7) of sufficient length, longer than the aforesaid horizontal cylinder, H, that each end of said knife shall pass through the necessary parts of the aforesaid frame, Z, the requisite distance, the one end, a, aforesaid far enough to be attached as aforesaid to the said double joint piece W, and leave room for the vibration of said knife; the other end (b 2nd Figs. 1 and 2,) far enough for a bearing of said knife, and to take hold of when said knife is required to be changed or drawn from the said machine. I place the aforesaid knife in a horizontal line endwise, with the back thereof down, and edge thereof vertical, and at or near the periphery of the aforesaid cylinder, H, and parallel with the axis of said cylinder, and with the vertical edge of said knife corresponding from end to end of said cylinder with the horizontal transverse diameter of said cylinder, or level with the axis thereof which is the same. I make the said knife about six inches wide, and about half an inch thick: I support the said knife in the position aforesaid with movable boxes (g, and, h, Figs. 1 and 2,) near each end thereof, either with or without friction rollers, by passing the said ends of the knife through said boxes. I secure said boxes to the said frame with slide bolts, y, 2 Fig. 2, and nuts for the purpose of adjusting said knife as hereinafter mentioned. I construct one or more intermediate or intervening bearings (e, Figs 1, 2 and 7,) for the said knife according to the length thereof, either with or without friction rollers, and movable at pleasure for the purpose of adjusting said knife as hereinafter mentioned, and the said intermediate bearing or bearings, e, (through the top of which I pass the said vertical edged knife) I secure to a seat (n, Figs. 1, 2, and 7,) or seats when requisite hereinafter described.

I construct the aforesaid intervening seat or seats as follows: I extend the said seat and bearing from the bottom or floor of the frame, Z, up so that the top of the bearing shall clamp the knife from the back thereof about two thirds of the distance from the back to the edge of said knife, leaving said edge clear, and fit the said clamp, or friction rollers when I use them (k, l, m, Figs. 2 and 7,) handsomely to the back and sides of said knife.

I make bearing, e, to rest and slide at pleasure on said seat, n, which seat I fasten firmly with bolts to the said bottom or floor of the said frame, Z, and for the purpose of sliding or moving the aforesaid bearing I extend a tongue or projection of the said bearing downward into a groove or oblong space which I make in said seat, and pass a handscrew (i Figs. 1, 2, and 7,) through said seat and tongue, to operate on said projection or tongue in the common way, and when the said bearing or bearings are properly adjusted by operating on it with said screw. I secure said bearings firmly with bolts—which bolts I fasten in said seat, n, and pass them up through oblong apertures in a flanch (o, Figs. 1, 2, and 7,) which I make at the base of said bearing and screw nuts which I place upon said bolts down tight upon said flanch.

I construct two small cylinders or rollers (p, q, Figs. 1 and 3,) each of the same length as the before mentioned larger cylinder H, and each about six inches in diameter. One of these small cylinders, p, I place on the top of the said large cylinder, H, and parallel therewith; and I screw the journals of said small cylinder in sliding boxes (w, Fig. 3,) regulated by screws (s, Fig. 3,) and spiral springs (r, Fig. 3,)—the sliding boxes I secure in arms of the said frame Z, said small cylinder I adjust as is hereinafter mentioned. I place the other small cylinder q, also parallel with the said large cylinder, H, and so that the peripheries of both cylinders (H, and $q$,) will come nearly in contact, and secure the journals of the said last mentioned small cylinder, in the same manner that I secure the journals of the first mentioned small cylinder, in sliding boxes regulated by screws and spiral springs, which boxes I secure to arms of the said frame, Z, I also place said last mentioned small cylinder as aforesaid, far enough above the edge of the hereinbefore specified knife to admit the hereinafter specified guide ($r$, 2nd Figs. 1 and 3,) as hereinafter mentioned.

I construct a movable guide ($r$ 2nd, Figs. 1 and 3,) to extend in length the whole length of the before mentioned cylinders (H and $q$,) and I make said guide on one side thereof with a concave surface to correspond with the convex surface or periphery of said cylinder, H, and I make one edge or top of said guide to fit the periphery of the said cylinder, $q$, and to rest or slide with a circular motion against said cylinder, $q$, as may be required, I place this guide immediately above the edge of the aforesaid knife with its top or edge aforesaid fitted on and resting or sliding against the periphery of the said cylinder, $q$, and with its concave side aforesaid in near contact with the periphery of said cylinder, H, I extend at least two arms ($w$, 3rd, Figs. 1 and 3,) from the said guide, at right angles therewith and nearly horizontal: and one of these arms I place at each end of said guide. I support the aforesaid guide, in the proper place as aforesaid, resting against the said small cylinder as aforesaid and so as by passing the said guide, against the said cylinder by placing weights on said arms, the face of the guide will press or move, toward the periphery of the larger cylinder, H, first before specified, by attaching the aforesaid guide with a center pin ($t$, Figs. 1 and 3) at each end, to circular plates, ($t$ 2nd Figs. 1 and 3,) which center pin, I make farther from the said larger cylinder than the aforesaid bearing of the said guide, which bearing I make between the said periphery of the said larger cylinder, H, and a perpendicular line ($per$ Fig. 3,) at full from the center of the said small cylinder, $q$, against the periphery of said small cylinder, and by fastening the upper ends of said circular plates ($t$ 2nd) (which plates I pass round in front of the last mentioned small cylinder) to center pins ($u$, Fig. 3,) in sliding boxes ($v$, Fig. 3,) which center pins I make in a perpendicular line ($per$ 2nd Fig. 3), falling through said larger cylinder, H; and secure the said box in arms or parts of the said frame, Z, by passing clamp bolts through a tongue or shank which I make to said box, by placing clamp nuts ($w$, 2nd Fig. 3,) on said bolts clamping the said arms and tongues firmly together. I procure the aforesaid pressure of the said guide toward the periphery or circular surface of the said larger cylinder, by placing weights ($y$, Figs. 1 and 3,) on the above mentioned arms of said guide, ($w$, 3rd).

I construct the before mentioned spring (V, Figs. 1 and 2,) by preference of the best spring steel, of sufficient strength to prevent the before specified tappet wheel tappets from knocking the before specified slide plate, and tappet plate out of place and to ease the concussions of the aforesaid tappets, but of small power in comparison with the before specified tappet wheels, said spring opposing and assisting the motions of the said slide plate alternately, by its vibrations. I secure the aforesaid spring, and the two arms thereof as follows. I place the middle distance of said spring in a groove or niche made at or near the end aforesaid of the before specified slide plate T, and secure the middle of said spring with bolts and nuts, the bolts passing through the spring, and a flange in which the aforesaid groove is made at the said end, U, of said slide plate aforesaid, and I extend the arms of said spring each way horizontally the necessary distance to admit its requisite vibrations and I secure the end of each of said arms ($j$, Figs. 1 and 2) by placing them in studs ($y$, Figs. 1 and 2,) or in grooves made in said studs—which studs I attach firmly to the said frame, Z, though movable at pleasure, either to, or from, the center of said spring and leaving said spring to vibrate by the action of said slide plate, and the power of said spring alternately, and so as the said spring shall be at ease only when the said slide and tappet plates are in their first position aforesaid. I adjust my said machine for operation as follows:

I first adjust my small cylinders, so as to leave sufficient space between the peripheries of the top cylinder and the large cylinder to receive the hide to be operated on with a slight pressure; and the side cylinder or small cylinder immediately over the knife and guide, I adjust in the same manner, but so that the hide shall receive sufficient pressure together with the adhesion of the hide to the larger cylinder to drive it through the machine; by operating on the journals of the said small cylinders, with the aforesaid screws ($s$,) in both the aforesaid adjustments. I then adjust the aforesaid knife, by placing the vertical edge thereof, sufficiently near the periphery of the larger cylinder, H, aforesaid, to shave, or split from the hide, the thickness required. This adjustment I make by operating on the aforesaid movable bearings ($g$, $h$, $e$,) of the said knife accordingly by the aforesaid screws ($i$, Figs. 1, 2, and 7,) and slide bolts ($y$, 2d Fig. 2,) of the bearings ($g$ and $h$,) aforesaid. I then place the aforesaid weights, $y$, on the said arms, of the aforesaid guide, and the machine is adjusted for operation.

I operate with my aforesaid machine as follows—I first dampen or saturate the skin or leather to be operated on with clean water, then roll up said skin or leather in one entire roll (Fig. 3,) snugly and without any foldings, and place said roll on a table, or on the floor, immediately behind the aforesaid large cylinder, H, and parallel lengthwise therewith. I then put the machine in motion by communicating the necessary power as aforesaid to the propelling shaft A, aforesaid; I then enter by hand, the fore end of said skin or leather, between the peripheries of the aforesaid top and large cylinders, $p$ and H, where the said skin or leather receives a light pressure between said cylinders, and the said end of the skin or leather passes on adhering to the surface of the said large cylinder until it comes to the periphery of the said small side cylinder, $y$, when it receives a greater pressure, than at first, between said cylinder and cylinder H, and is forced down toward the edge of the aforesaid knife X, and being conducted by the aforesaid guide $r$, 2nd and by the cohesion of said skin or leather, to the surface of said large cylinder is pressed on the edge of said knife, until the said skin or leather is passed through said machine, and is split or dressed as required from end to end.

When I wish to change the knife, I stop the machine take out the bolt that passes through the end of said knife and the perpendicular clamp of the said double joint piece, W, and draw the said knife out of the said machine by taking hold of said end $b^2$ and replace the same or another knife of the same dimensions by pushing it endwise into the machine through all the aforesaid bearings and replace the aforesaid bolt and nut.

Having thus described my aforesaid machine the manner of adjusting said machine and the mode of using it.

What I claim as my invention and believe to be new and original and desire to secure by Letters Patent, is—

The hereinbefore specified combination of the tappet wheels, tappet plate and spring for operating the knife.

JONAS P. FAIRLAMB.

Witnesses:
   JOSEPH WALL,
   JAMES MEGRATTEN.